United States Patent [19]

Shimomura et al.

[11] Patent Number: 4,989,565

[45] Date of Patent: Feb. 5, 1991

[54] SPEED CONTROL APPARATUS FOR AN INTERNAL COMBUSTION ENGINE

[75] Inventors: Setsuhiro Shimomura; Akira Demizu, both of Himeji; Hitoshi Inoue, Amagasaki, all of Japan

[73] Assignee: Mitsubishi Denki Kabushiki Kaisha, Tokyo, Japan

[21] Appl. No.: 433,298

[22] Filed: Nov. 8, 1989

[30] Foreign Application Priority Data

Nov. 9, 1988 [JP] Japan ............ 63-284437
Nov. 26, 1988 [JP] Japan ............ 63-298734

[51] Int. Cl.[5] ............ F02M 3/06; H02P 9/04
[52] U.S. Cl. ............ 123/339; 290/40 C
[58] Field of Search ............ 123/339, 352; 290/40 B, 290/40 C

[56] References Cited

U.S. PATENT DOCUMENTS

| | | | |
|---|---|---|---|
| 4,467,761 | 8/1984 | Hasegawa | 123/339 |
| 4,479,472 | 10/1984 | Shimamura | 123/339 |
| 4,617,890 | 10/1986 | Kobayashi et al. | 123/339 |
| 4,633,093 | 11/1986 | Otobe et al. | 123/339 |
| 4,665,871 | 5/1987 | Shimomura et al. | 123/352 |
| 4,667,632 | 5/1987 | Shimomura et al. | 123/339 |
| 4,682,044 | 7/1987 | Motate et al. | 290/40 C |
| 4,877,003 | 10/1989 | Shimomura et al. | 123/339 |
| 4,877,273 | 10/1989 | Wazaki et al. | 123/339 |
| 4,879,983 | 11/1989 | Shimomura et al. | 123/339 |

FOREIGN PATENT DOCUMENTS

| | | | |
|---|---|---|---|
| 0037240 | 2/1984 | Japan | 123/339 |
| 155547 | 9/1984 | Japan . | |
| 0268841 | 11/1986 | Japan | 123/339 |

*Primary Examiner*—Tony M. Argenbright
*Assistant Examiner*—Robert E. Mates
*Attorney, Agent, or Firm*—Sughrue, Mion, Zinn, Macpeak and Seas

[57] ABSTRACT

A rotational speed controller for an internal combustion engine of a vehicle has an air bypass passage which bypasses the throttle valve of the engine. A solenoid valve controls the air intake rate through the bypass passage. The output current of a generator which is driven by the engine is monitored by a current sensor. Based on the current which is sensed, an air intake adjuster calculates the change in the air intake rate through the bypass passage necessary to compensate for the load exerted on the engine by the generator so as to maintain a constant engine speed. The solenoid valve is controlled to change the air intake rate through the bypass passage by the amount calculated by the air intake adjuster. The change in the air intake rate can be calculated on the basis of the level of the generator current and/or the rate of change of the generator current. When a period sensor detects that the generator current is fluctuating with a prescribed amplitude and period, the air intake adjuster calculates the change in the air intake rate on the basis of the average value of the generator current. At other times, it calculates the change in the air intake rate using the instantaneous value of the generator current.

6 Claims, 5 Drawing Sheets

SPEED CONTROL APPARATUS FOR AN INTERNAL COMBUSTION ENGINE

BACKGROUND OF THE INVENTION

This invention relates to a speed control apparatus for an internal combustion engine of an automobile. More particularly, it relates to a speed control apparatus which can prevent fluctuations of the idle speed of an engine when electrical equipment of an automobile is switched on or off.

It is desirable to maintain the idle rotational speed of an automotive internal combustion engine at an optimal value in order to minimize engine noise, vibrations, and fuel consumption. Various feedback systems exist for controlling the idle speed of an engine. In these systems, an air bypass passage is provided which enables intake air to bypass the throttle valve. The air intake rate through the bypass passage is controlled by means of a control valve so as to minimize the difference between a target idle speed and the actual idle speed.

Due to delays in the detection of the rotational speed of an engine and response delays by the control valve for the air bypass passage, it takes time for a conventional rotational speed controller to adjust the idle speed to the target value. When electrical equipment of an automobile, such as headlights or fan motors, is turned on or off, the load applied to the engine by the generator which powers the electrical equipment suddenly changes. On account of the response delay of conventional speed controllers, the change in the engine load causes a momentary fall or rise in the engine speed when the electrical equipment is turned on or off, respectively.

Japanese Published Unexamined Patent Application No. 59-155547 discloses an idle speed control method for an automobile engine in which the operating state (on or off) of each piece of electrical equipment in an automobile is monitored by a corresponding sensor. When a piece of electrical equipment is switched on, the air intake rate into the engine is increased by a prescribed amount by opening a valve in an air bypass passage which bypasses the throttle valve of the engine. Similarly, when a piece of electrical equipment is switched off, the air intake rate through the air bypass passage is decreased. The increase or decrease in the air intake rate compensates for the increase or decrease in the load on the engine when the electrical equipment is turned on or off, thereby theoretically preventing a change in the engine rotational speed. The amount by which the air intake rate needs to be changed for the operation of each piece of electrical equipment is stored in a map in the memory of a control unit.

However, the above-described control method has the following drawbacks.

(1) An automobile is equipped with many different pieces of electrical equipment. If the electronic control unit is responsive to the switching on or off of each piece of equipment, a large number of sensors are necessary for detecting the operating state of the electrical equipment. Furthermore, the electronic control unit must have a large memory and large processing capacity in order to handle the input signals corresponding to all the pieces of electrical equipment. The electronic control unit therefore ends up being expensive and complicated.

(2) The data which is stored in the memory of the control unit indicates the average change in the air intake rate necessary to maintain a constant rotational speed when each piece of electrical equipment is turned on or off. For example, the memory contains the average change in the air intake rate corresponding to the operation of a typical set of headlights, a typical set of windshield wipers, etc. However, due to manufacturing inconsistencies, the properties of the electrical equipment which is actually mounted on a vehicle are often different from the properties of typical electrical equipment of the same type. Therefore, the necessary change in the air intake rate upon the operation of the headlights of a vehicle may be different from the average value stored in the memory of the electronic control unit. Furthermore, the extent to which a piece of electrical equipment actually acts as a load on an engine depends on a number of factors which are not taken into consideration by the data stored in the control unit, such as the engine operating temperature. Therefore, the change in the air intake rate when a piece of equipment is operated as indicated by the data in the memory may be different from the actual change in air intake rate necessary to maintain a constant engine speed.

(3) When a plurality of pieces of electrical equipment are simultaneously operated, the total change in the air intake rate required to maintain a constant engine speed may be less than a simple sum of the changes in air intake rate when each piece of equipment is operated individually. This is because the actual load which is applied to an engine when electrical equipment is operated is determined by the current which is output by the generator which powers the electrical equipment. The generator has a maximum generating capacity. If the total current demand from the various pieces of electrical equipment exceeds this generating capacity, the excess current demand is supplied by the battery of the vehicle and does not represent a load on the engine. If the air intake rate is increased in accordance with the total current demand by the electrical equipment, when the total current demand exceeds the generating capacity of the generator, the change in air intake rate will be excessive and the engine rotational speed will momentarily rise when the electrical equipment is turned on. In Japanese Published Unexamined Patent Application No. 59-155547 which is described above, an attempt is made to solve this problem by setting an upper limit on the increase in air intake rate. However, due to the impossibility of predicting the exact operating characteristics of a specific generator or of a specific piece of electrical equipment, as described in paragraph (2), in actual practice, it is impossible to set an accurate upper limit on the increase in the air intake rate, so the change in the air intake rate when electrical equipment is operated may be too small or too large.

(4) The electrical equipment of an automobile includes items such as turn signals and hazard lamps which draw a periodic current rather than a steady one. These items therefore exert a periodic load on an engine. To prevent the engine speed from fluctuating due to this load, it is necessary to adjust the air intake rate in a cyclic manner. As a result, the structure of the air intake rate controller becomes complicated. In addition, after a change in the setting of the valve in the air bypass passage is made, the engine must pass through the suction, compression, power, and exhaust strokes before the air intake rate actually changes. A surge tank for suppressing fluctuations in the air intake rate produces a further delay in the response of the actual air intake rate. The total delay due to these factors is referred to as the suction delay. If the period of the rise and fall of the current consumed by the electrical equipment is close in value to the suction delay, the changes in the air intake rate can become out of phase with the fluctuations in the current for which they are supposed to compensate. In this case, the engine rotational speed ends up being decreased when the electrical current is increasing, and it ends up being increased when the electrical current is decreasing. Instead of fluctuations in the engine rotational speed being suppressed, they are magnified, resulting in unstable engine operation.

SUMMARY OF THE INVENTION

Accordingly, it is an object of the present invention to provide a speed control apparatus for an internal combustion engine of an automotive vehicle which can maintain a constant engine rotational speed when electrical equipment of the vehicle is operated.

It is another object of the present invention to provide a speed control apparatus which does not require a large memory or data processing capacity.

A speed control apparatus for an engine of a vehicle in accordance with the present invention controls the rotational speed of the engine by adjusting the air intake rate into the engine through an air bypass passage which allows intake air to bypass the throttle valve of the engine. Electrical equipment of the vehicle is powered by a generator which is driven by the engine. The air intake rate through the air bypass passage is adjusted in accordance with the actual output current of the generator. The output current of the generator reflects the actual load exerted on the engine by the generator, so the air intake rate can be accurately adjusted to compensate for the actual load and thereby maintain a constant engine speed.

An engine speed control apparatus according to the present invention comprises an air bypass passage which bypasses the throttle valve of an engine and a bypass valve which controls the flow of air through the air bypass passage. A current sensor senses the output current of a generator which is driven by the engine. An air intake adjuster which is responsive to the current sensor calculates the change in the air intake rate through the bypass passage necessary to compensate for the load applied to the engine by the generator so as to maintain a constant engine rotational speed. A bypass valve controller controls the bypass valve so that the air intake rate through the air bypass passage is changed by the amount calculated by the air intake adjuster.

The air intake rate can be adjusted based on the level of the generator output current, on the rate of change of the generator output current, or on a combination of the level and the rate of change of the generator output current.

A speed control apparatus according to the present invention may also be equipped with a period sensor for sensing when the generator output current is fluctuating with a prescribed amplitude and a prescribed period. When the period sensor determines that the output current is fluctuating in this manner, the air intake adjuster calculates the change in the air intake rate based on the average output current of the generator. When the output current is not fluctuating periodically, the air intake adjuster calculates the change in the air intake rate based on the instantaneous output current of the generator.

Figure 1:
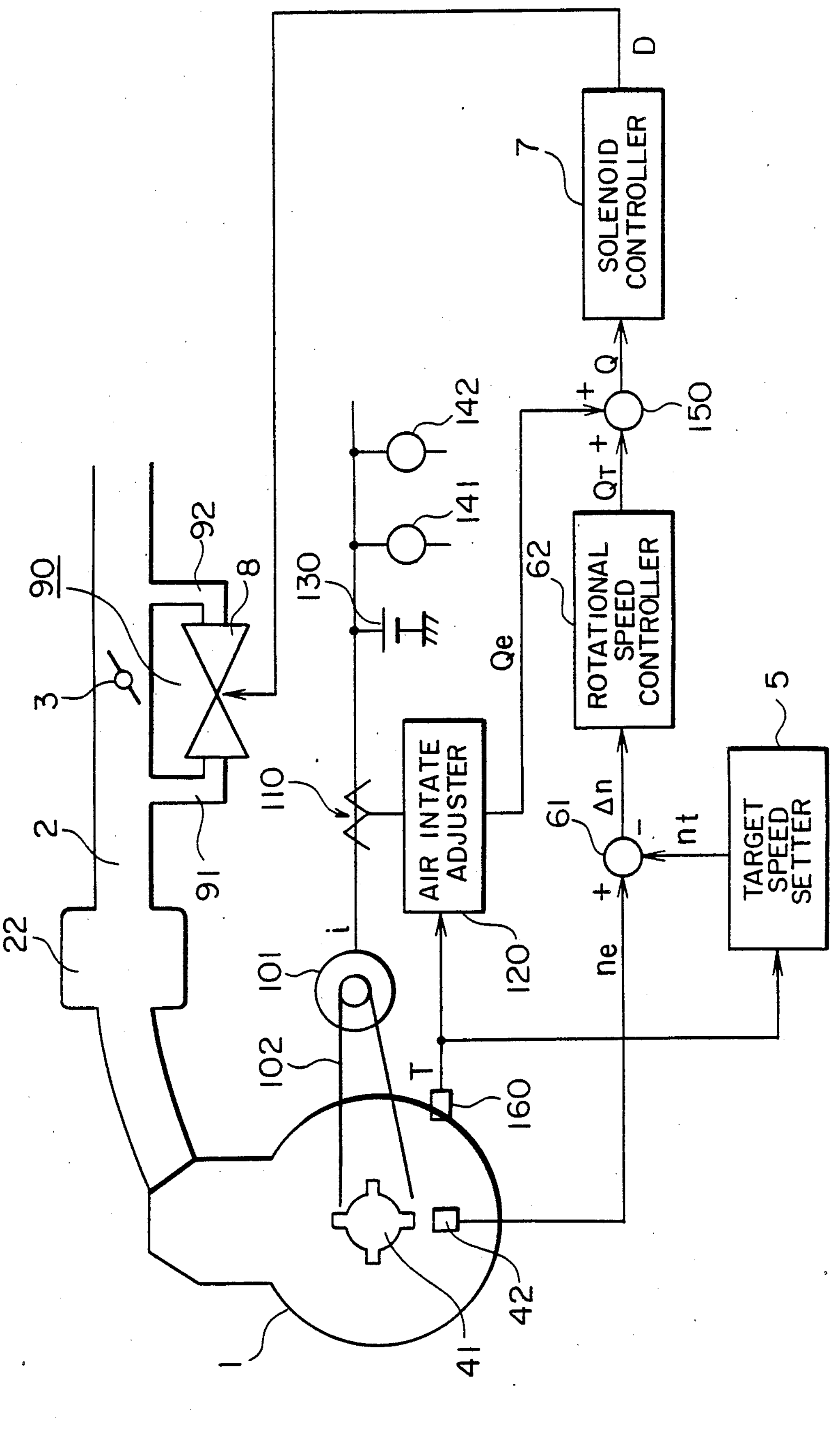
FIG. 1 is a block diagram of a first embodiment of a speed control apparatus according to the present invention.

FIGS. **5*a*-5*c* are graphs of the generator output current i, the air intake rate correction signal Qe, and the engine rotational speed $n_e$ as a function of time during the operation of the embodiment of FIG. 1**.

FIGS. **6*a*-6*c*** are graphs of the generator output current i, the air intake rate correction signal Qe, and the engine rotational speed $n_e$ as a function of time when the air intake rate is adjusted on the basis of the rate of change of the generator output current i.

Figure 7:
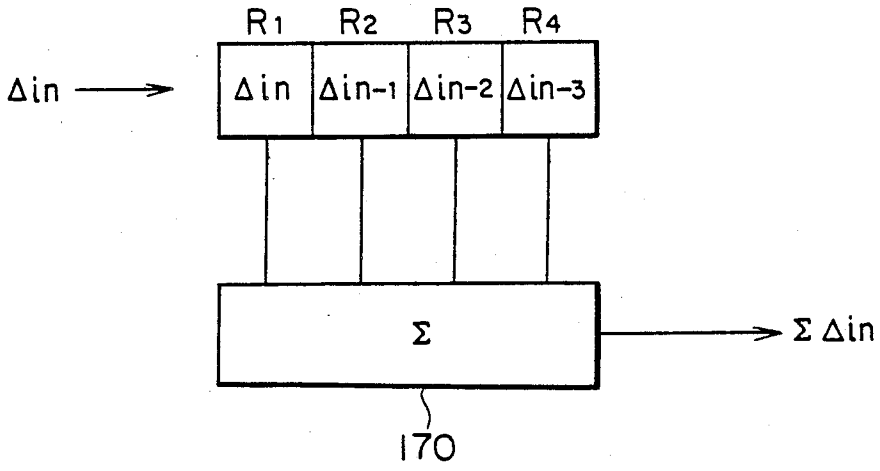

FIG. 7 is a block diagram of an arrangement which can be employed in the present invention to determine changes in the generator current when the current contains a large noise component.

Figure 8:
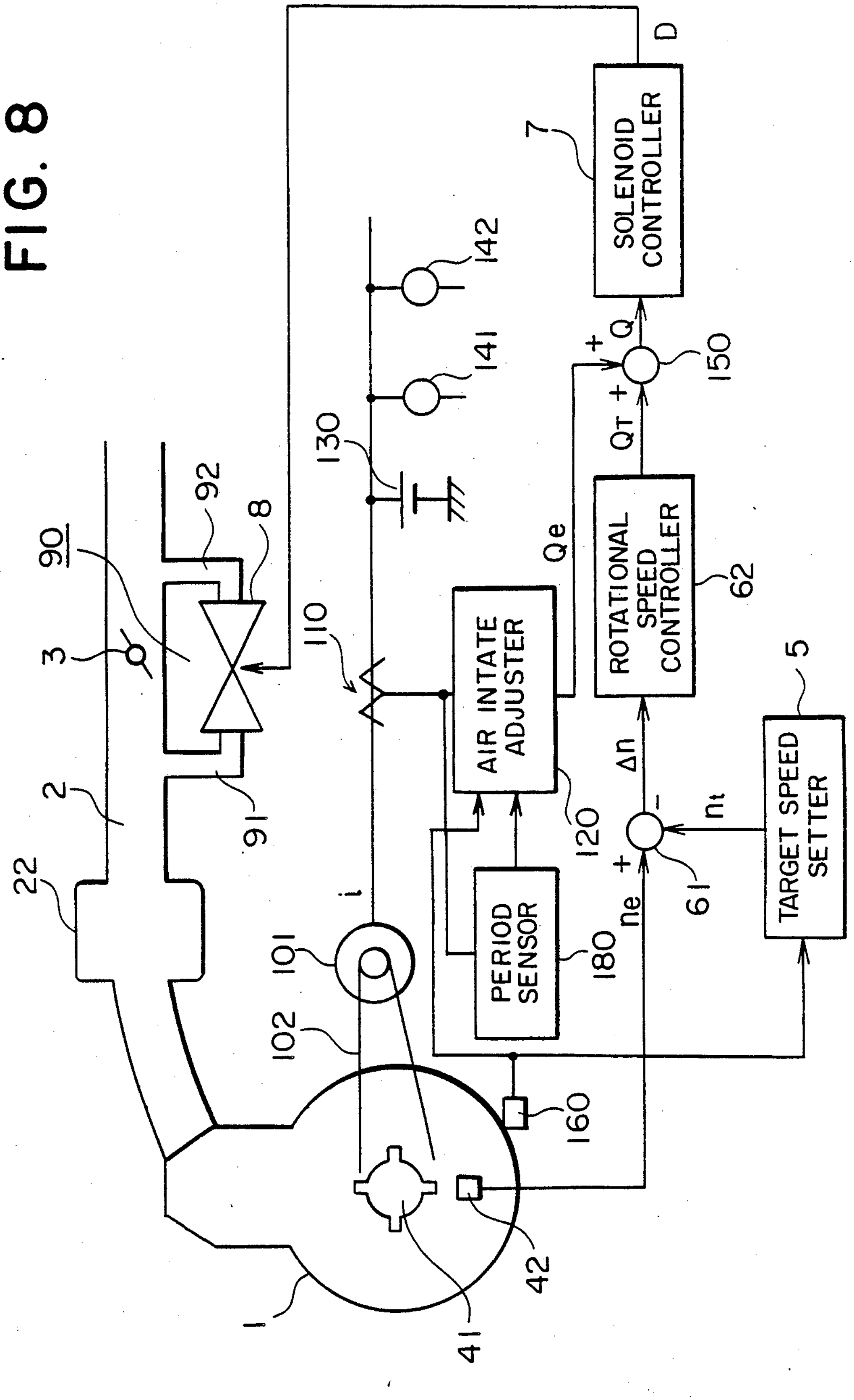

FIG. 8 is a block diagram of a second embodiment of a speed controller according to the present invention.

FIGS. **9*a*-9*d* are graphs of the generator output current i, the air intake rate correction signal Qe, the actual air intake rate Qr into the engine via a bypass passage, and the engine rotational speed as a function of time during the operation of the embodiment of FIG. 8**.

DESCRIPTION OF THE PREFERRED EMBODIMENTS

A number of preferred embodiments of a speed control apparatus according to the present invention will now be described while referring to the accompanying drawings. FIG. 1 is a block diagram of a first embodiment as applied to the internal combustion engine 1 of an unillustrated vehicle. The engine 1 is equipped with an air intake pipe 2 in which a throttle valve 3 is pivotally mounted. A surge tank 22 is installed in the air intake pipe 2 between the throttle valve 3 and the engine 1. Two bypass pipes 91 and 92 are installed on the outside of the air intake pipe 2. One end of each bypass pipe 91 and 92 opens onto the inside of the air intake pipe 2 on the downstream and upstream sides, respectively, of the throttle valve 3. The bypass pipes 91 and 92 together constitute an air bypass passage 90. The other ends of the bypass pipes 91 and 92 are connected with one another by a solenoid valve 8. When the solenoid valve 8 is open, air can bypass the throttle valve 3 and enter the engine 1 via the bypass passage 90. The solenoid valve 8 has linear characteristics and is controlled by an input signal from a solenoid controller 7. The input signal has a duty cycle D.

A gear 41 is mounted on a rotating portion of the engine 1 such as the crankshaft or cam shaft. The rotation of the gear 41 is detected by a rotational speed sensor 42, which generates a rotational speed signal $n_e$ which indicates the engine rotational speed.

A temperature sensor 160 which is mounted on the engine 1 senses the engine temperature T and generates a corresponding output signal. This output signal is provided to a target speed setter 5 and to an air intake adjuster 120. Based on the engine temperature and various other conditions which are sensed by unillustrated sensors, the target speed setter 5 determines a target rotational speed $n_t$ for a state in which no load is applied to the engine 1 and generates a corresponding output signal. This signal and the output signal from the rotational speed sensor 42 are input to a subtracter 61, which generates a signal proportional to the difference $\Delta n$ between the actual rotational speed $n_e$ and the target rotational speed $n_t$. The output signal of the subtracter 61 is input to a rotational speed controller 62. The controller 62 performs proportional, integral, or differential control to generate an air intake control signal $Q_T$ which has a magnitude corresponding to the air intake rate through the air bypass passage 90 necessary to decrease the difference $\Delta n$ between the actual and target rotational speeds.

An electrical generator 101 is driven by the engine 1 through a belt 102. The output current i of the generator 101 is provided to a battery 130 and to various pieces of electrical equipment 141 and 142 of the vehicle such as headlights, turn signals, and windshield wipers. The output current i is detected by a current sensor 110 which provides the air intake adjuster 120 with an input signal corresponding to the magnitude of the current i. An automobile is generally equipped with a large number of pieces of electrical equipment which are powered by a generator, but for simplicity, only two items have been illustrated.

The air intake adjuster 120 generates an air intake rate correction signal Qe based on the output current i of the generator 101 as indicated by the current sensor 110 and on the temperature T which is sensed by the temperature sensor 160. Qe indicates the increase in the engine air intake rate necessary to maintain a constant engine rotational speed when the generator 101 is producing an output current i. The output signal Qe of the air intake adjuster 120 is added to the output signal $Q_T$ of the rotational speed controller 62 by an adder 150, which generates an air intake rate control signal Q which is input to the solenoid valve controller 7. This signal Q indicates the total air intake rate through the air bypass passage 90 necessary to maintain the engine rotational speed $n_e$ equal to the target speed $n_t$. Based on the value of Q, the solenoid valve controller 7 generates an output single having a duty cycle D. This output signal causes the solenoid valve 8 to open and close with the duty cycle D.

Figure 2:
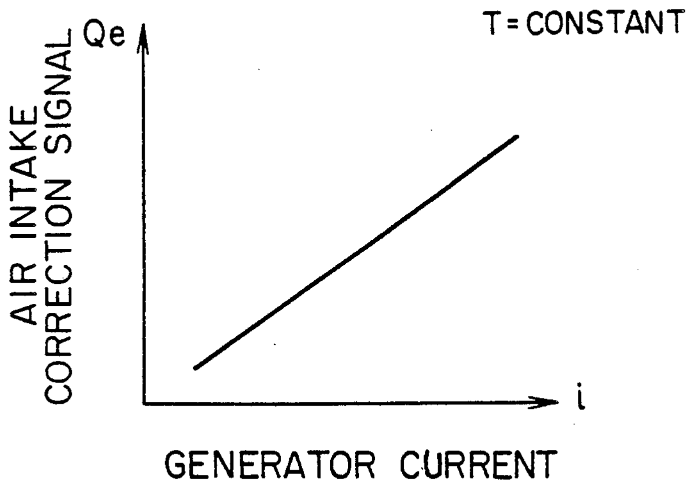
FIG. 2 is a graph of the air intake rate correction signal from the air intake adjuster as a function of the generator output current.

FIG. 2 shows the output characteristics of the air intake adjuster 120 as a function of the output current i of the generator 101 at a constant engine temperature T. The relationship between Qe and i can be empirically determined in advance and stored in the air intake adjuster 120 in the form of a map.

Figure 3:
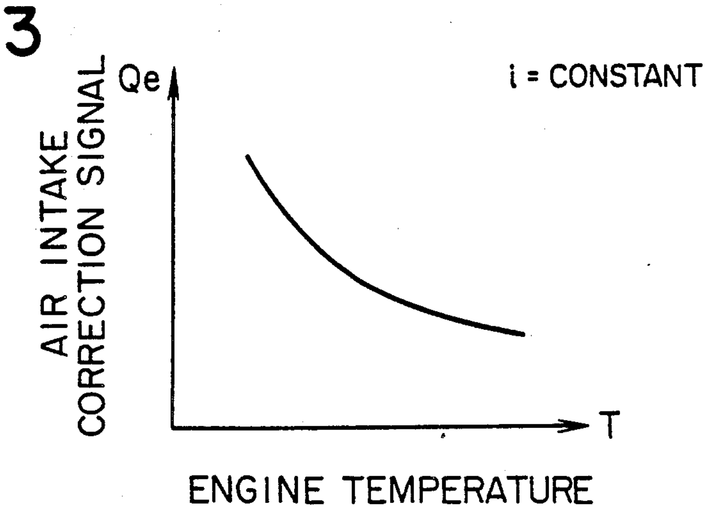
FIG. 3 is a graph of the relationship between the air intake rate correction signal from the air intake adjuster and engine temperature for a constant engine load.

The value of the air intake rate correction signal Qe is also a function of the engine temperature T. This is because the frictional resistance of the engine 1 falls as the engine temperature increases. Therefore, for the same current i, the engine air intake rate necessary to maintain a target rotational speed falls as the engine temperature rises. FIG. 3 illustrates the relationship between the air intake rate correction signal Qe and the engine temperature T for a constant generator output current.

The air intake adjuster 120 can determine the air intake rate correction signal Qe in two steps by first determining a preliminary value Qe' corresponding to a reference temperature using a first function h which is a function of the current i. Qe' can then be corrected for the difference between the actual temperature and the reference temperature to obtain the actual air intake rate correction signal Qe using a second function j which is a function of the temperature T. Namely, $Qe'=h(i)$, and $Qe=Qe'\times j(T)$. Alternatively, a function f(i,T) which gives Qe as a function of the current i and the engine temperature T can be stored as a map in the air intake adjuster 120, and the value of Qe can be determined in a single step using i and T as input variables.

Figure 4:
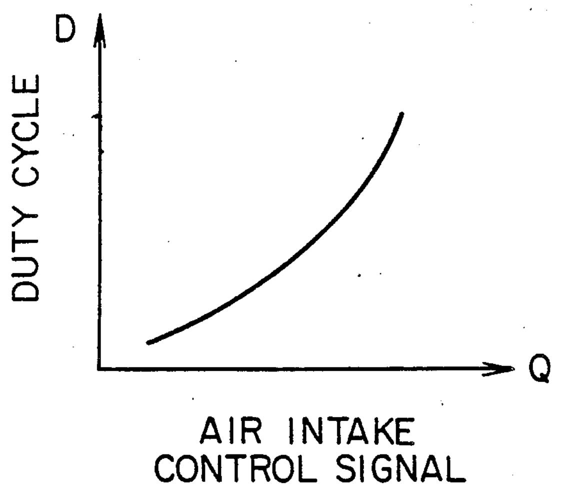
FIG. 4 is a graph of the duty cycle of the solenoid valve as a function of the air intake control signal which is input to the solenoid driver.

FIG. 4 illustrates the duty cycle D of the output signal of the solenoid valve controller 7 as a function of the air intake rate control signal Q. The relationship between Q and D is determined by the operating characteristics of the solenoid valve 8 and is previously stored in the solenoid valve controller 7. The duty cycle D determines the average degree of opening of the solenoid valve 8. When the solenoid valve 8 is operated with a duty cycle D, the air flow rate through the solenoid valve 8 corresponds to the air intake rate indicated by the control signal.

FIGS. 5*a*–5*c* show the generator output current i, the air intake rate correction signal Qe, and the engine rotational speed $n_e$ during the operation of the embodiment of FIG. 1. When the electrical equipment 141 and 142 is turned on, the generator output current i rapidly increases, and the air intake rate correction signal Qe increases at the same rate. If the actual air intake rate Qr into the engine 1 through the bypass passage 90 increased at the same rate as the air intake rate correction signal Qe, as shown by curve A in FIG. 5*b*, the engine rotational speed $n_e$ would remain completely constant, as shown by curve C in FIG. 5*c*. However, due to the presence of the surge tank 22, the actual air intake rate Qr through the bypass passage 90, shown by curve B of FIG. 5*b*, can not increase as quickly as the air intake rate correction signal Qe. Therefore, the increase in the actual air intake rate Qr is not adequate to compensate for the increased load on the engine due to the current i, and the engine rotational speed $n_e$ momentarily drops when the electrical equipment is turned on, as shown by curve D of FIG. 5*c*. Similarly, when the electrical equipment is turned off, due to the lag in the actual air intake rate Qr with respect to the air intake rate correction signal Qe, the engine rotational speed $n_e$ momentarily rises. Curve E of FIG. 5*c* illustrates the fluctuation in the engine rotational speed $n_e$ when correction of the air intake rate according to the present invention is not performed.

In order to suppress the fluctuation in the rotational speed $n_e$ shown by curve D of FIG. 5*c*, it is necessary to increase the speed at which the actual air intake rate Qr responds to changes in the generator output current i. An increase in the response speed can be attained by making the air intake rate correction signal Qe a function of the rate of change of the current i. FIG. 6 illustrates the generator output current i, the air intake rate correction signal Qe, and the engine rotational speed $n_e$ when the air intake rate correction signal Qe is determined by the rate of change of the generator current i. The generator current i is sampled by the air intake adjuster 120 at regular intervals to obtain a series of measurements $i_1, i_2, \ldots i_n$. Each time the current is sampled, the difference between two consecutive current measurements $\Delta i_n = i_n - i_{n-1}$ is calculated. Since $\Delta i_n$ is the change in the generator output current i in a unit length of time, it indicates the rate of change of the generator output current i. The air intake adjuster 120 then calculates an air intake rate correction signal Qe based on the difference $\Delta i_n$. The relationship between Qe and $\Delta i_n$ can be previously determined by experiment and expressed by a function $g(\Delta i_n)$, which is stored in the air intake adjuster 120 as a map with $\Delta i_n$ as an input variable. The greater the change $\Delta i_n$ in the generator current i between successive samplings, i.e., the greater the rate of change of the generator current i, the greater is the air intake rate correction signal Qe which is output by the air intake adjuster 120. In this case, the air intake rate correction signal Qe changes more rapidly than the generator output current i, so even though the actual air intake rate Qr lags behind the air intake rate correction signal Qe, the rate of change of the air intake rate Qr is rapid enough to compensate for the change in engine load due to the increased generator current i. As a result, the rotational speed $n_e$ responds to changes in the current i in the manner shown by curve A in FIG. *6c.* As shown in FIG. *6b,* the air intake rate correction signal Qe falls back to its original value when the generator output current reaches a constant value. In the absence of the rotational speed controller 62, a steady-state offset in the rotational speed $n_e$ would be produced as shown by curve B of FIG. *6c,* and the rotational speed n would stabilize at a value which is lower than the target rotational speed. However, the rotational speed controller 62 restores the rotational speed $n_e$ to the target speed, as shown by curve A of FIG. *6c.* Curve C of FIG. *6c* shows the rotational speed $n_e$ when air intake rate is not adjusted for changes in the generator current i according to the present invention.

Figure 5:
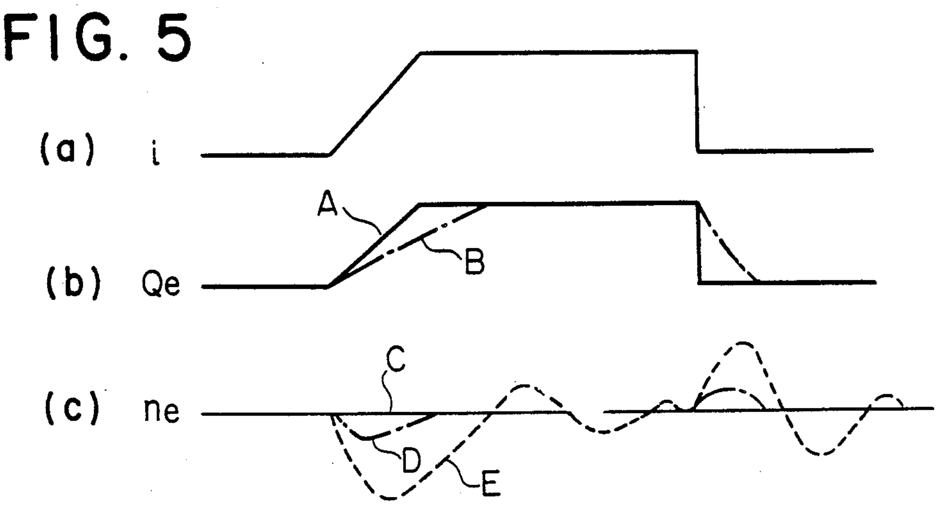
Figure 6:
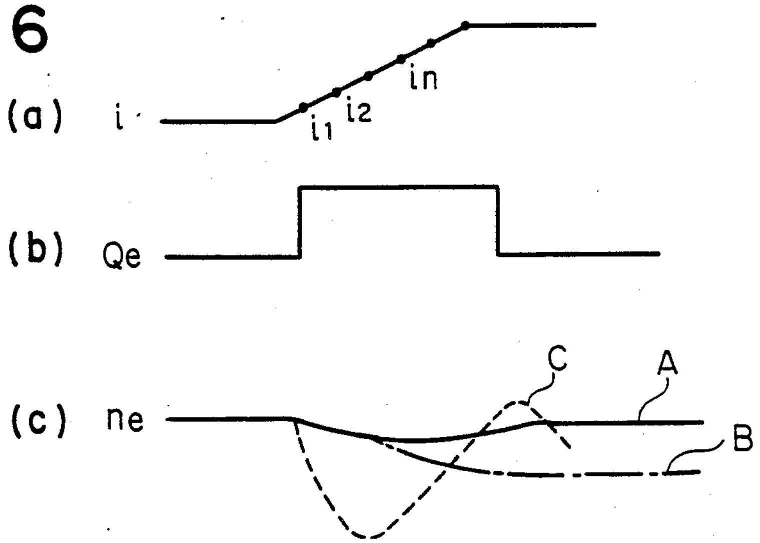

It is possible to combine the control methods of FIGS. 5 and 6 so that the air intake rate correction signal Qe is determined by both the level and the rate of change of the generator current i. Namely, the air intake rate can be determined by the formula $Qe=f(i,T)+g(-\Delta i_n)$. With such a method of control, fluctuations in the engine rotational speed when the generator current initially changes can be suppressed, and a steady-state offset of the engine rotational speed $n_e$ can be prevented by the air intake adjuster 120 itself instead of the rotational speed controller 62, resulting in quicker response.

Although in the preceding description function g is a function only of $\Delta i_n$, it could be a made a function of both $\Delta i_n$ and the engine temperature T.

In the above-described method of calculating Qe, the value of $\Delta i_n$ is determined upon each current sampling. However, at times, the ripple or noise component of the generator current i may be larger than the change $\Delta i_n$ in the generator current i due to the electrical equipment being turned on or off, making it impossible to sense $\Delta i_n$. It is possible to avoid this problem by increasing the length of the sampling period, but doing so results in an undesirable delay in the response of Qe to changes in the generator current i. FIG. 7 illustrates an arrangement which enables more accurate measurements of changes in the generator current i when it contains a large noise or ripple component. As shown in this figure, the air intake adjuster 120 can be equipped with a plurality of registers R and an adder 170. The registers R store four successive value of $\Delta i$ ($\Delta i_n$ to $\Delta i_{n-3}$, wherein $\Delta i_n$ is the most recent value). In this example, there are four registers R1–R4. Each time the current is sampled, the most recent change $\Delta i_n$ in the current is input to the first register R1, and the values already stored in the registers are shifted one register to the right in the manner R1→R2→R3→ R4. Upon each sampling, the contents of the four registers are summed by the adder 170 to obtain the sum $\Sigma\Delta i_n$. This sum reflects the changes in the generator current i upon each sampling and is sufficiently large so as to be distinguishable from ripple or noise. Accordingly, Qe can be accurately adjusted for changes in the generator current i even in the presence of ripple or noise in the generator current i.

As mentioned earlier, when the generator current i fluctuates with a prescribed period which is close to the suction delay time, fluctuations in the rotational speed $n_e$ due to the fluctuating output current of the generator 101 grow larger and larger with time. FIG. 8 is a block diagram of an embodiment of the present invention which can prevent this phenomenon. The structure of this embodiment is similar to that of the embodiment of FIG. 1, but it further includes a period sensor 180 which monitors the period of the generator output current i. Furthermore, the air intake adjuster 120 includes an unillustrated averaging circuit which calculates the average value $i_{av}$ of the generator output current i. The period sensor 180 provides the air intake adjuster 120 with an output signal indicating when the generator output current i is fluctuating with a prescribed amplitude and a prescribed period.

When the period sensor 180 determines that the generator current i is not fluctuating with the prescribed amplitude and period, the air intake adjuster 120 determines the air intake rate correction signal Qe o the basis of the instantaneous value of the generator current i using the function f and/or g, in the same manner as in the embodiment of FIG. 1. However, when the period sensor 180 determines that the generator current i is fluctuating with the prescribed amplitude and period, the averaging circuit of the air intake adjuster 120 determines the average value $i_{av}$ of the generator current i, and then the air intake adjuster 120 calculates the air intake rate correction signal Qe on the basis of the average value $i_{av}$.

In calculating Qe, the air intake adjuster 120 again used the functions f and/or g, but in this case, the manipulated variable is the average generator current $i_{av}$ rather than the instantaneous current i. For example, instead of calculating Qe=f(i,T), it calculates $Qe=f(i_{av},T)$.

When the generator current i is not fluctuating, the operation of this embodiment is substantially the same as that of the embodiment of FIG. 1, and the air intake rate Qe and the engine rotational speed $n_e$ are as shown by FIGS. *5b* and *5c.*

Figure 9:
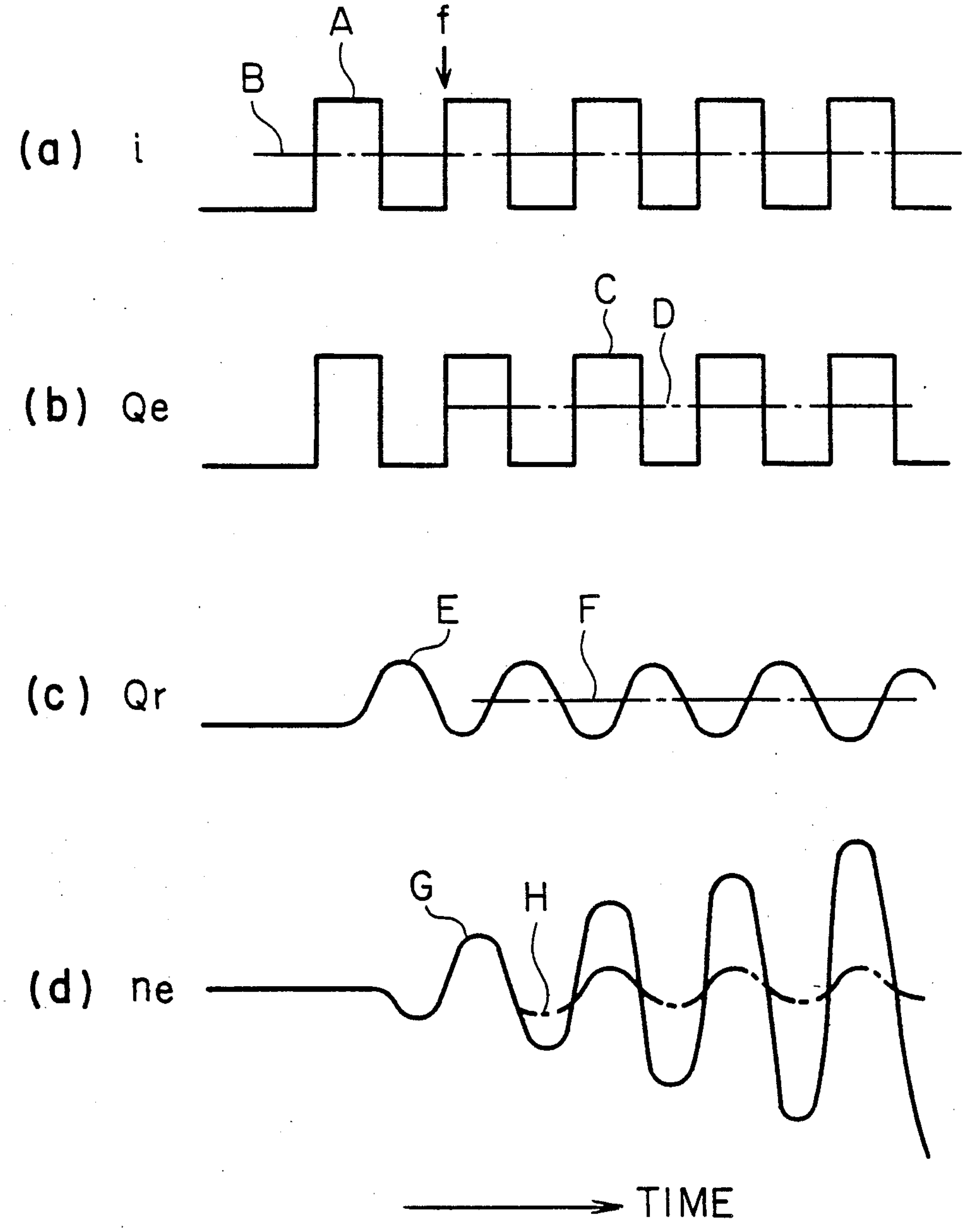

FIG. 9 illustrates the generator output current i, the air intake rate correction signal Qe, the actual air intake rate Qr, and the rotational speed $n_e$ during the operation of the embodiment of FIG. 8 when the generator output current i is fluctuating with a period which is close to the suction delay of the engine 1. Curve A of FIG. *9a* shows the generator output current i. If the period sensor 180 were not present, the air intake rate correction signal Qe would fluctuate as shown by curve C of FIG. *9b,* and the actual air intake rate Qr would fluctuate as shown by curve E of FIG. *9c* with a delay with respect to the air intake rate correction signal Qe. It can be seen that the fluctuations of the actual air intake rate Qr would be out of phase with the fluctuations in the generator current i for which they are supposed to compensate. When the generator current i initially rose, due to the slow response of the actual air intake rate Qr, the rotational speed $n_e$ would fall below the target speed. By the time that the air intake rate Qr finally increased to compensate for the increase in the current i, the current i would have already fallen back to its original level, so the increase in the actual air intake rate Qr would cause the rotational speed $n_e$ to rise above its target level. The air intake rate Qr would then fall to compensate for the decrease in the generator current i following the initial increase in the current i, but by this time, the current i would already be increasing again. Thus, the air intake rate Qr would end up increasing when it should be decreasing and vice versa. As a result, fluctuations in the rotational speed $n_e$ due to fluctuations in the current i would be reinforced rather than suppressed, causing violent fluctuation of the rotational speed $n_e$, as shown by curve G of FIG. 9*d.*

In order to prevent these violent oscillations, when the period sensor 180 senses that the generator current i is oscillating with a prescribed period and amplitude, the air intake adjuster 120 calculates the average generator current $i_{av}$, shown by curve B of FIG. 9*a,* and then it calculates the air intake rate correction signal Qe corresponding to this average current $i_{av}$. It takes one period of current fluctuation for the air intake adjuster 120 to determine if the current is fluctuating with the prescribed period, so the air intake adjuster 120 begins to calculate Qe based on the average current $i_{av}$ starting at the time indicated by f in FIG. 9*a.* The resulting air intake rate correction signal Qe has a steady value as shown by curve D of FIG. 9*b,* and the actual air intake rate Qr likewise has a steady value, as shown by curve F of FIG. 9*c.* As a result, the engine rotational speed $n_e$ undergoes only small oscillations, as shown by curve H of FIG. 9*d.*

In this embodiment, periodic fluctuation of the generator current i is detected by the period sensor 180. However, since it is known in advance which pieces of electrical equipment 141 and 142 have periodic characteristics, the period sensor 180 can be replaced by one or more sensors which indicate to the air intake adjuster 120 when these pieces of equipment are turned on. The air intake adjuster 120 can then automatically calculate the air intake rate correction signal Qe on the basis of the average generator current i as soon as the equipment with the periodic characteristics remains on. When the equipment is turned off, the air intake adjuster 120 can once again calculate Qe on the basis of the instantaneous generator current i. Such an arrangement has a quick response speed, since it does not have to wait for an entire period of the fluctuations of the generator output current i (up to point f of FIG. 9*a*) in order to determine if the generator current i has a prescribed period. It is also possible to combine the current sensor 110 with sensors for sensing the operation of equipment with periodic characteristics.

As described above, an engine speed control apparatus according to the present invention adjusts the air intake rate into an engine in response to changes in the output current of a generator. When the generator current is fluctuating with a prescribed amplitude and period, the air intake rate is controlled based on the average generator output current, while at other times it is controlled based on the instantaneous generator output current. As a result, the present invention provides the following benefits.

(1) The air intake rate can be quickly adjusted in response to changes in the engine load caused by the turning on and off of electrical equipment, so fluctuations in the engine rotational speed can be minimized.

(2) Instead of monitoring the operation of each piece of electrical equipment, a control apparatus according to the present invention monitors only the generator current, so only a single current sensor is necessary, resulting in an apparatus with a simple structure.

(3) The net load on the engine due to the operation of electrical equipment can be sensed, so the air intake rate can be adjusted by the appropriate amount.

(4) The engine rotational speed can be accurately controlled regardless of variations in the engine temperature.

(5) Fluctuations in the engine rotational speed due to a fluctuating electrical load can be minimized.

What is claimed is:

1. A rotational speed control apparatus for an internal combustion engine which drives a generator, comprising:

- an air bypass passage which bypasses a throttle valve of the engine and through which engine intake air can enter the engine;
- a bypass valve for controlling the flow of air through the air bypass passage;
- a rotational speed sensor for sensing the actual rotational speed of the engine;
- a target speed setter for setting a target rotational speed of the engine;
- a rotational speed controller responsive to the rotational speed sensor and the target speed setter for calculating the air flow rate through the air bypass passage necessary to make the actual rotational speed equal the target rotational speed;
- a current sensor for sensing the output current of the generator;
- air intake adjusting means responsive to the current sensor for calculating the change in the air flow rate through the air bypass passage necessary to prevent the engine rotational speed from being changed from the target rotational speed by the operation of the generator; and
- bypass valve control means responsive to the rotational speed controller and the air intake adjusting means for controlling the bypass valve so that the air flow rate through the air bypass passage equals the total of the air flow rate calculated by the rotational speed controller and the change in the air flow rate calculated by the air intake adjusting means, wherein the air intake adjusting means comprises means for calculating the change in the air flow rate as a function of the rate of change of the generator output current.

2. A speed control apparatus as claimed in claim 1, further comprising a temperature sensor for sensing the engine temperature, wherein the air intake adjusting means comprises means for calculating the change in the air flow rate as a function of the generator current and the engine temperature sensed by the temperature sensor.

3. A rotational speed control apparatus for an internal combustion engine which drives a generator, comprising:

- an air bypass passage which bypasses a throttle valve of the engine and through which engine intake air can enter the engine;
- a bypass valve for controlling the flow of air through the air bypass passage;
- a rotational speed sensor for sensing the actual rotational speed of the engine;

a target speed setter for setting a target rotational speed of the engine;

a rotational speed controller responsive to the rotational speed sensor and the target speed setter for calculating the air flow rate through the air bypass passage necessary to make the actual rotational speed equal the target rotational speed;

a current sensor for sensing the output current of the generator;

air intake adjusting means responsive to the current sensor for calculating the change in the air flow rate through the air bypass passage necessary to prevent the engine rotational speed from being changed from the target rotational speed by the operation of the generator; and bypass valve control means responsive to the rotational speed controller and the air intake adjusting means for controlling the bypass valve so that the air flow rate through the air bypass passage equals the total of the air flow rate calculated by the rotational speed controller and the change in the air flow rate calculated by the air intake adjusting means, wherein the air intake adjusting means comprises means for calculating the change in the air flow rate as a function of the magnitude and the rate of change of the generator output current.

4. A speed control apparatus as claimed in claim 3, further comprising a temperature sensor for sensing the engine temperature, wherein the air intake adjusting means comprises means for calculating the change in the air flow rate as a function of the generator current and the engine temperature sensed by the temperature sensor.

5. A rotational speed control apparatus for an internal combustion engine which drives a generator, comprising:

an air bypass passage which bypasses a throttle valve of the engine and through which engine intake air can enter the engine;

a bypass valve for controlling the flow of air through the air bypass passage;

a rotational speed sensor for sensing the actual rotational speed of the engine;

a target speed setter for setting a target rotational speed of the engine;

a rotational speed controller responsive to the rotational speed sensor and the target speed setter for calculating the air flow rate through the air bypass passage necessary to make the actual rotational speed equal the target rotational speed;

a current sensor for sensing the output current of the generator;

air intake adjusting means responsive to the current sensor for calculating the change in the air flow rate through the air bypass passage necessary to prevent the engine rotational speed from being changed from the target rotational speed by the operation of the generator; and bypass valve control means responsive to the rotational speed controller and the air intake adjusting means for controlling the bypass valve so that the air flow rate through the air bypass passage equals the total of the air flow rate calculated by the rotational speed controller and the change in the air flow rate calculated by the air intake adjusting means, further comprising period sensing means for sensing when the generator output current is fluctuating with a prescribed period and amplitude, wherein the air intake rate adjusting means comprises means for calculating the change in the air flow rate as a function of the instantaneous value of the generator output current when the generator output current is not fluctuating with the prescribed period and amplitude, and for calculating the change in the air flow rate as a function of the average value of the generator output current when the generator output current is fluctuating with the prescribed period and amplitude.

6. A speed control apparatus as claimed in claim 5, further comprising a temperature sensor for sensing the engine temperature, wherein the air intake adjusting means comprises means for calculating the change in the air flow rate as a function of the generator current and the engine temperature sensed by the temperature sensor.

* * * * *